United States Patent
Damabhorn

(10) Patent No.: US 7,339,607 B2
(45) Date of Patent: Mar. 4, 2008

(54) SECURITY CAMERA AND MONITOR SYSTEM ACTIVATED BY MOTION SENSOR AND BODY HEAT SENSOR FOR HOMES OR OFFICES

(76) Inventor: Yongyouth Damabhorn, 11442 Downey Ave., Downey, CA (US) 90241

( * ) Notice: Subject to any disclaimer, the term of this patent is extended or adjusted under 35 U.S.C. 154(b) by 448 days.

(21) Appl. No.: 10/907,254

(22) Filed: Mar. 25, 2005

(65) Prior Publication Data

US 2006/0215022 A1    Sep. 28, 2006

(51) Int. Cl.
H04N 7/18    (2006.01)
H04N 7/173   (2006.01)

(52) U.S. Cl. .................... 348/143; 348/153; 348/155; 348/154; 348/152; 340/541

(58) Field of Classification Search ............... 348/143, 348/142, 153, 154, 155, 159, 156, 152; 725/109, 725/10, 12; 340/541, 539.22, 545.2
See application file for complete search history.

(56) References Cited

U.S. PATENT DOCUMENTS

| | | | | |
|---|---|---|---|---|
| 5,517,236 | A * | 5/1996 | Sergeant et al. | 348/143 |
| 5,666,157 | A * | 9/1997 | Aviv | 348/152 |
| 6,166,763 | A * | 12/2000 | Rhodes et al. | 348/143 |
| 6,313,872 | B1 * | 11/2001 | Borg | 348/155 |
| 6,462,774 | B1 * | 10/2002 | Bildstein | 348/143 |
| 6,597,391 | B2 * | 7/2003 | Hudson | 348/153 |
| 6,720,990 | B1 * | 4/2004 | Walker et al. | 348/143 |
| 6,759,957 | B2 * | 7/2004 | Murakami et al. | 340/541 |
| 6,933,964 | B2 * | 8/2005 | Sung et al. | 348/143 |
| 7,023,913 | B1 * | 4/2006 | Monroe | 375/240.01 |
| 7,034,681 | B2 * | 4/2006 | Yamamoto et al. | 340/541 |
| 7,046,142 | B2 * | 5/2006 | Hershkovitz et al. | 340/541 |
| 7,092,006 | B2 * | 8/2006 | Walker et al. | 348/143 |
| 7,106,333 | B1 * | 9/2006 | Milinusic | 345/474 |
| 7,124,427 | B1 * | 10/2006 | Esbensen | 725/109 |
| 7,131,136 | B2 * | 10/2006 | Monroe | 725/105 |
| 7,186,271 | B2 * | 3/2007 | Horikiri et al. | 726/35 |
| 7,199,817 | B2 * | 4/2007 | Mottur et al. | 348/142 |
| 7,202,884 | B1 * | 4/2007 | Barraclough | 348/14.01 |
| 7,236,176 | B2 * | 6/2007 | Milinusic | 345/474 |
| 7,253,732 | B2 * | 8/2007 | Osann, Jr. | 340/541 |
| 7,262,691 | B2 * | 8/2007 | Kanayama | 340/506 |
| 7,280,042 | B2 * | 10/2007 | Trela | 340/539.22 |

* cited by examiner

Primary Examiner—David Ometz
Assistant Examiner—Jean W. Désir
(74) Attorney, Agent, or Firm—Jen-Feng Lee, Esq.

(57) ABSTRACT

A security camera and monitor system activated by motion sensor and body heat sensor for homes or offices that utilizes home VCR, or other household A/V recordation equipment, as a recording means and recordation only occurs when motion is detected, achieving great simplicity and economy in the installation and use of the security system. Present invention also provides status information allowing users to check the status of any security breach before entering the premises, greatly enhancing the safety of home residents or office personnel.

11 Claims, 11 Drawing Sheets

STATUS LOGIC DISPLAY

SECURITY CAMERA AND MONITOR SYSTEM ACTIVATED BY MOTION SENSOR AND BODY HEAT SENSOR FOR HOMES OR OFFICES

FIELD AND BACKGROUND OF THE INVENTION

Security systems are commonly found in many households and offices today. Most of the currently available security systems, however, do not have a status-reporting mechanism that can be accessed remotely by the users.

Complex security systems require the use of close-circuit cameras and dedicated recording means that operate on a 24/7 basis. The recorded media, mostly likely tapes, have to be changed and reused from time to time, though most content on the tapes is blank for long and uneventful period of time. The associated cost for such systems are inevitably high and often cannot be budgeted by many households.

OBJECTS AND SUMMARY OF THE INVENTION

Present invention relates generally to a security system activated by motion detectors or body heat sensors, for homes or offices. More particularly, present invention primarily utilizes home VCR, or other readily-available recording appliances, as a recording means. Furthermore, recordation only occurs when motion is detected, achieving great simplicity and economy in the installation and use of the security system, as compared to Time Lapse VCR monitor and recording systems.

Present invention further provide status information, allowing users to check the status of any security breach before entering the premises, greatly enhancing the safety of home residents or office personnel.

DESCRIPTION OF THE DRAWINGS

The accompanying drawings, which are incorporated in and constitute a part of this specification, illustrate the preferred embodiment of the invention and together with the description, serve to explain the principles of the invention.

A brief description of the drawings is as follows.

DETAILED DESCRIPTION OF THE PREFERRED EMBODIMENT

Present invention provides a security system for homes or offices that features great savings when it comes to installation and its normal usage.

For ease of reference and further explanation, a term "SM Session", abbreviation for Security Monitor Session, has been defined as the time period when user(s) of present invention "arm" the system to work (to monitor the houses/offices) by utilizing all the cameras, sensors, etc, until user(s) "disarm" the system (using phone, keypad or other means) when they do not want the system to monitor any security breaches, for example, the user(s) are back to their houses/offices.

For ease of reference and further explanation, a term "SD Period", abbreviation for Sustained Detection Period, has been defined as the present time period in which continuous detection of movement will cause controllers (A, B, C and D; detailed later) activated by motion detector(s) to remain active. After an SD Period, motion detector will shut itself off, along with said controllers (A, B, C and D). Another SD Period will be initiated when another wave(s) of motion is detected by motion detector(s). A SD Period is somewhere between 1 to 60 seconds; present value is 5, but is user-selectable.

For ease of reference, the colored status/light is defined as:

RED: Red will go on at any moment during a SM Session whenever motion detector(s) detect motion. Correspondingly, at any moment during a SM Session, whenever motion detector(s) detect no motion, Red light/status will be off. Any detection of motion will cause the recording to take place. Red light is indicated by number 93.

GREEN: Green will go on as long as there has been recording during a SM Session. That is, Green shows the existence of recording during a SM Session. Green light is indicated by number 94.

ORANGE: Orange will go on at any moment during a SM Session whenever body heat is detected by heat sensor(s). Correspondingly, at any moment during a SM Session, whenever no body heat is detected, Orange light/status will be off. Orange light is indicated by number 95. The detection of body heat is preset at the temperature range of between 86 to 99 degrees Fahrenheit.

YELLOW: Yellow will go on as long as there has been detection of body heat by heat sensor(s) during a SM Session. That is, Yellow shows the existence of body heat detection by heat sensor(s) during a SM Session. Yellow light is indicated by number 96.

Figure 1:
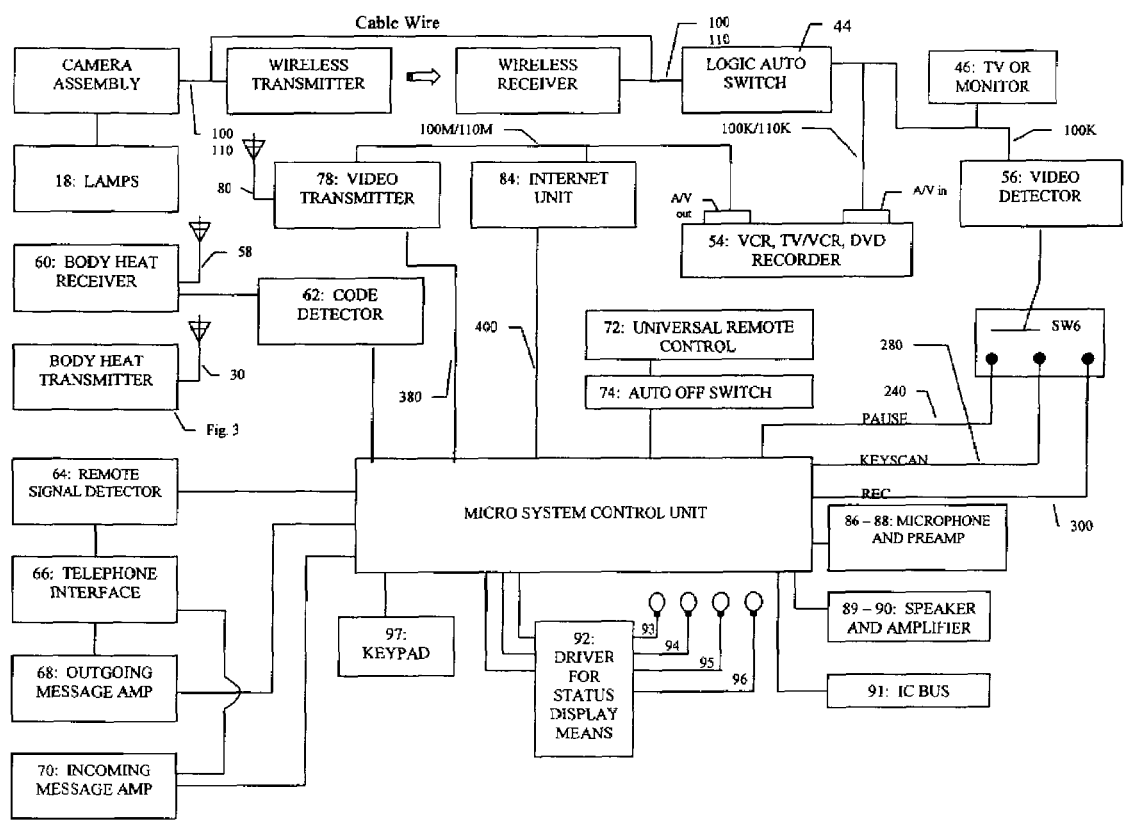
FIG. 1 shows the overall system architecture of present invention.

FIG. 1 outlines the overall system architecture.

By using a universal remote control unit (URC) 72 that connects to the Micro System Controller (MSC) unit, users can employ household VCR 54, or other commonly available recording equipment, to record any security breach. Such recording does not take place on a 24/7 basis, as most security systems do, which typically result in substantial blank images to be recorded for long and uneventful periods. Installation in accordance with the teachings of present invention would only cause recording to take place when motion detectors are triggered.

Said MSC consists of a modern day CPU together with IC Bus 91 that can receive signals/commands from video detector, remote detector and code detector to activate the system for recording, displaying, storing and transmitting status information; said MSC further has I/O ports, as well as ports to phone lines and other forms of network/Internet connection.

Multiple camera assemblies 08 can be installed in present invention, in predetermined spots. For illustration purpose, showing the logic of displaying up to 8 images using 2 QUAD formats (detailed later), present invention uses eight (8) camera assemblies 08A-08H as example. However, the construction of a security system is certainly not limited to the eight camera units 08; the number of cameras units 08 depends on individual user need.

Figure 2A:
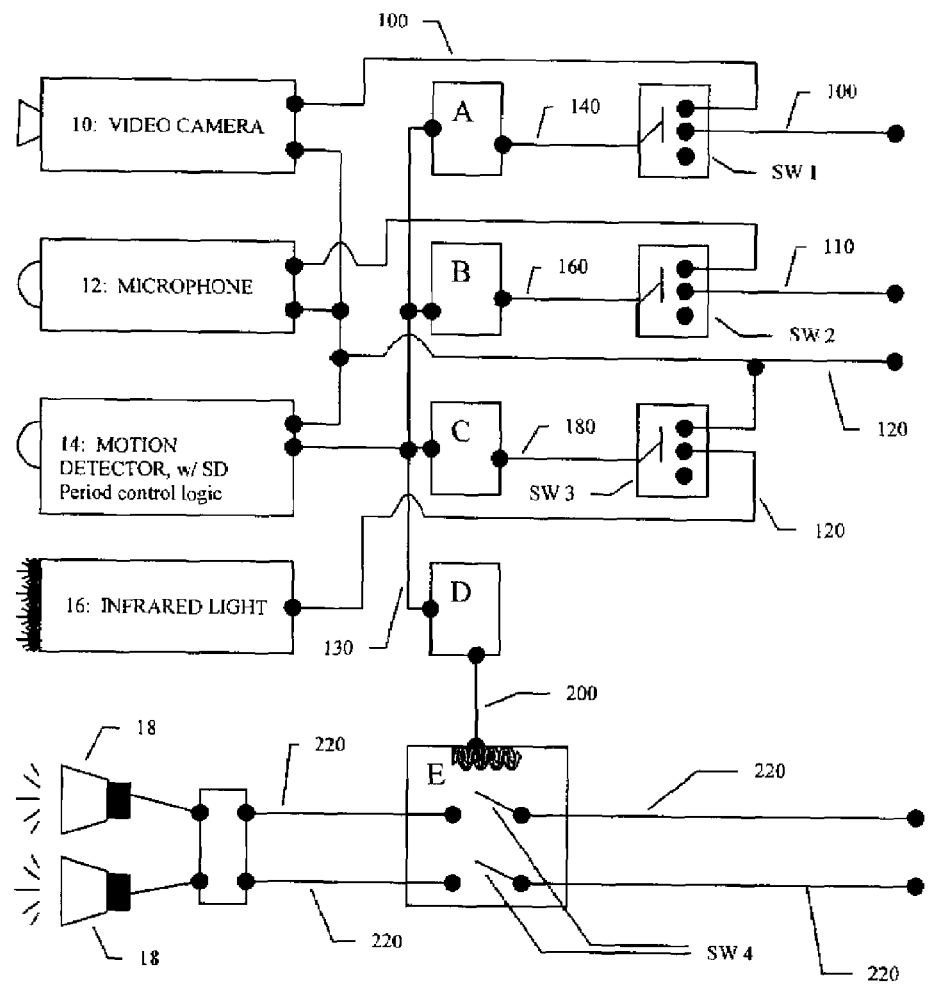
FIG. 2a shows the construction diagram of the motion-image trigger and intake unit, along with the connection to a few lamps that are commonly found around doorways and sidewalls.

Reference FIGS. 1 & 2a, video camera assemblies 08 have permanent power supply, or can be powered on after the system enters a SM Session. Motion detectors 14, installed in predetermined spots, which sense motion and enter a SD Period. During a SD Period, A, B, C and D controllers are activated, when control signal 130 is received from Motion Detectors 14.

Figure 2B:
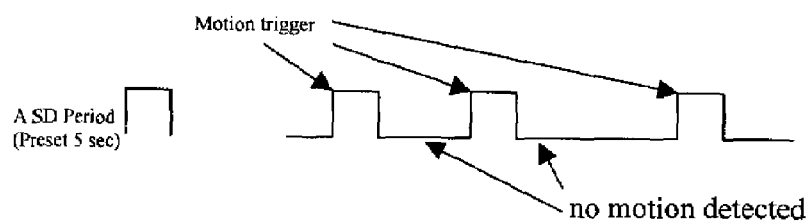
FIG. 2b shows the control logic of a Sustained Detection Period employed by motion detectors of present invention.

Motion detectors 14 have built-in timing control logic as implemented by FIG. 2b. When Controller A is activated, it causes control signal 140 to turn on switch SW1, which in turn allows captured video signals 100 from camera 10 to be transmitted to Logic Auto Switch 44 (detailed later) and further onward to recording means 54 (VCR, for example) and display means 46 (TV monitor, for example).

When Controller B is activated, it causes control signal 160 to turn on switch SW2, which in turn allows captured audio signals 110 from microphone 12 to be transmitted to Logic Auto Switch 44 and further onward to recording means 54 and display means 46. Video and audio signals coming out of Logic Auto Switch are separately denoted as 100k and 110k.

When Controller C is activated, it causes control signal 180 to turn on switch SW3, which in turns causes power 120 to be supplied to infrared light 16.

When video detector 56 detects the existence of video signal 100k from Logic Auto Switch 44, video detector 56 will cause switch SW6 to be placed in a "record position". When video detector 56 does not detect the existence of video signal 100k (no more motion is detected by motion sensor 14), SW6 will be placed in a "pause position". MSC receives the "record position" or "pause position" signal from SW6, and through Auto Off Switch 74, will cause the URC 72 to send the infrared command to the recording means 54.

Auto Off Switch 74, also represented as "Micro Processor Timing Switch" in the drawings, provides the necessary "off" action on to URC 72, similar to human finger's lifting from the buttons of a regular remote control, so that MSC's sending REC/PAUSE/STOP command to URC is properly done like human finger's pressing and releasing. Auto Off Switch 74 can also be implement by software components within MSC.

Each microphone 12 goes with each camera 10; they can be housed in the same package of the cameras, or can be separately housed.

Lamps 18 are commonly found near doorways and sideways, around houses or offices. These lamps 18 can optionally be electrically removed from the control of Relay E by users based on the consideration that users do not want to disturb the subject who is causing the security breach.

Motion detector will also send control signal to Relay Controller D to control the Relay E to turn on switch SW4 which supplies power to and light up lamps 18.

Video cameras 10, microphones 12, motion detectors 14, and A, B, C, D Controllers are always connected to power supply sources. In terms of system construction, the always power-on can also mean always powered on during a SM Session.

Figure 4:
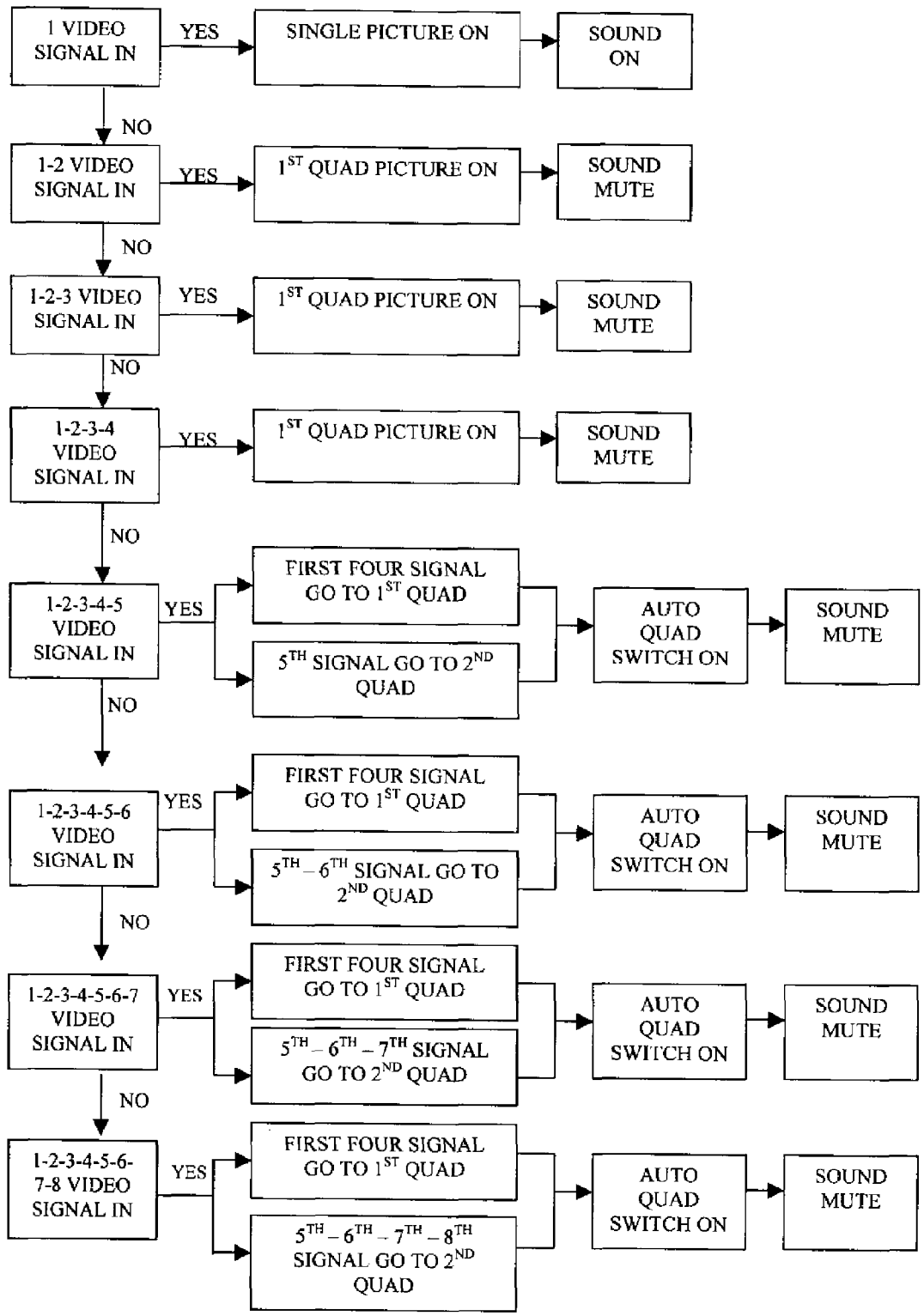
FIG. 4 shows the logical diagram of image transmission and display in the Single and/or Quad format, as would be implemented into the Logic Auto Switch unit of present invention.

Captured Video/Audio signals 100/110 will be sent to Logic Auto Switch 44 by cable or wireless transmission. The image display format adopted and controlled by Logic Auto Switch 44 is in the Single and/or Quad format, defined later; and its displaying logic is shown in FIG. 4.

A pre-programmed memory, IC BUS 91, works together with MSC and store received data in memory, and release the data out by the command of MSC. System Control Codes from 1 to 18 (detailed later) have been pre-programmed into IC BUS 91; IC BUS 91 further allows passwords to be set by individual users when a system pursuant to present invention is installed.

A status display means using light driver 92 is controlled by MSC to turn on/off the status lights of red 93, green 94, orange 95 and yellow 96. The controlling logic will be explained later on.

An answering machine keypad 97 is a key scan switch input for MSC to control over IC BUS 91.

Telephone interface 66 is connected to MSC, via remote signal detector 64, and acts to receive phone instructions (dial tone), record voice message or establish voice-link digital command.

A self-contained and self-controlling micro-processor based Internet unit 84 is controlled by MSC by power on/off signal 400. Internet unit 84, having audio/video input jack 82 receiving A/V signals 100M/110M from recording means 54, will cause the recorded signals to be transmitted out through Internet connection.

Depending on implementation, MSC can optionally have built-in Internet unit 84 that carry out the above-stated functions. This optional implementation, however, will not affect usage of present invention, such as the system control codes 03 and 04 related to the functions of Internet unit 84.

A video transmitter 78, connected to MSC, will receive command from telephone codes to wirelessly transmit recorded audio/video signals. Video transmitter is controlled by power on/off 380 connected to MSC.

Figure 3:
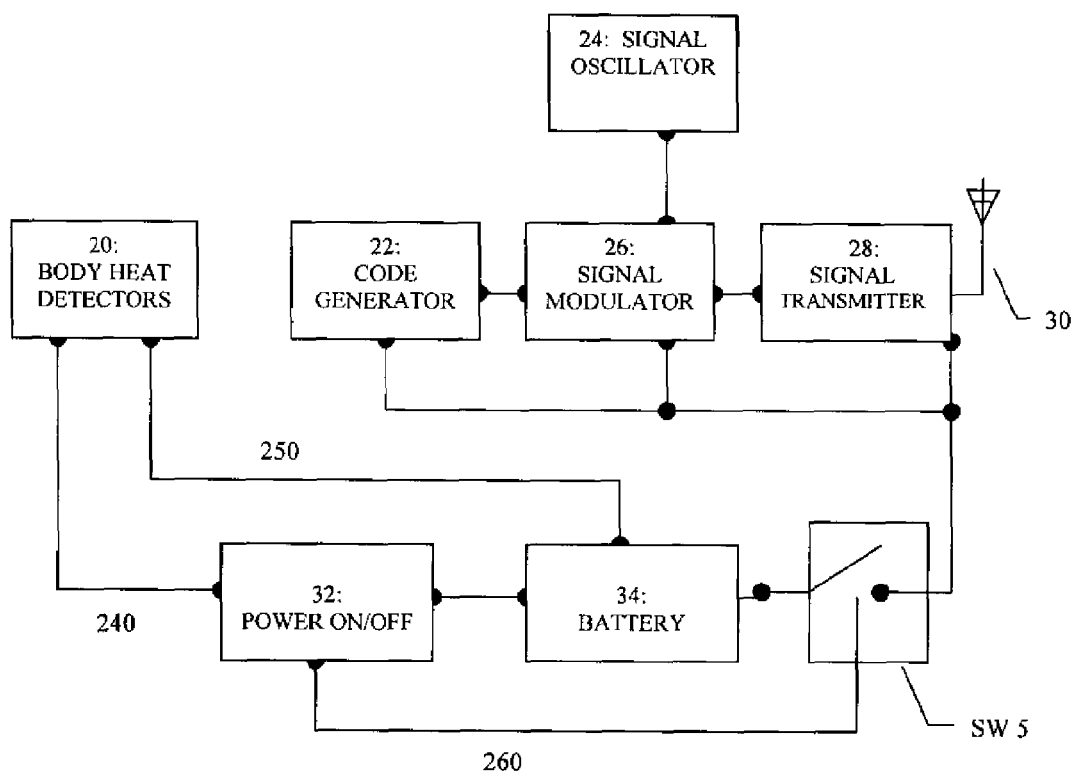
FIG. 3 shows the construction diagram of the body heat sensor unit and transmitter.

Body heat signal transmitter, detailed in FIG. 3, will be activated when it detects presence of body heat at predetermined spot and send the code signal to the heat receiver 60. Code detector 62 detects code signal and send to MSC to activate orange (and yellow) light and record system status.

Body heat detector 20 relies on battery power 34, which also supplies power to a power on-off unit 32 that controls switch SW5, which in turn controls the code generator 22, signal modulator 28, signal oscillator 24 and signal transmitter 28, as shown in FIG. 3.

MSC will be alerted by code detector 62 when wireless signal is received on receiver 58, from antenna 30, that body heat has been detected at the place(s) where said heat sensor(s) is installed. MSC will turn on Orange and Yellow status (lights) and also record equivalent status on IC Bus 91.

FIG. 4 shows the video image transmission and display in a Single and/or Quad format. A Quad form is defined as a roughly rectangle display area (such as the screen of a TV monitor) centrally, symmetrically and equally divided into four quadrants of equal rectangles.

As shown in FIG. 4, the images from up to 8 cameras are displayed in three ways:

First, when only one video camera 10 is sending image, the display has only one picture taking up the full display area. If microphones 12 are also in place, the sound playback is also enabled when only one video camera 10 is capturing and displaying images. Sound effect will be turned off when more than one video camera 10 is displayed in the following scenario.

Second, when 2 to 4 video cameras are sending images, the first Quad format is generated on the display means.

Third, when 5-8 video cameras are sending images, an Auto Quad Switch ("AQS") will cause the first Quad images to alternate with the second Quad images, so that each Quad appear on the display means for about 3-5 seconds, with first 4 images appearing in the first Quad, and the remaining (5 to 8) images appearing in the second Quad.

Figure 5:
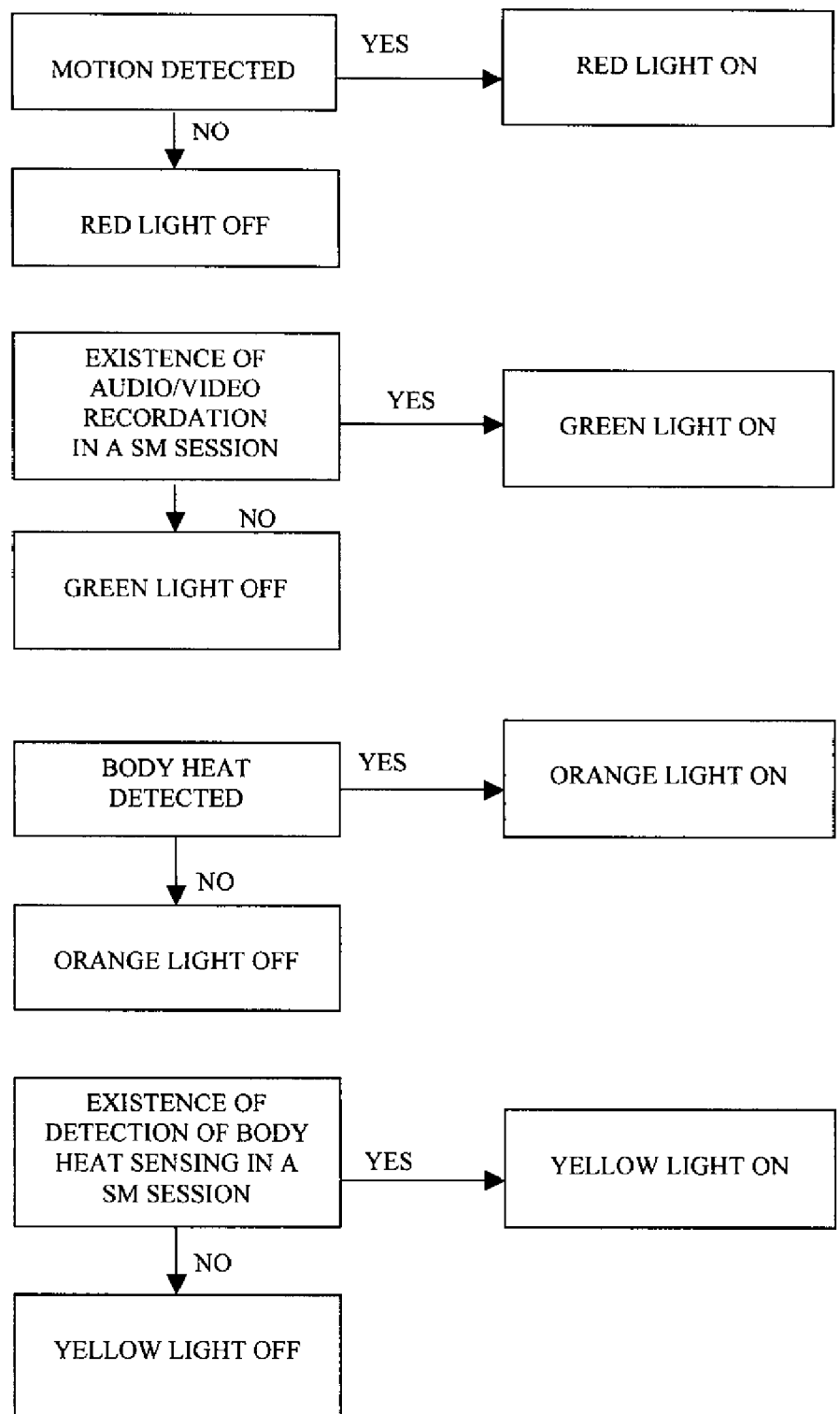
FIG. 5 shows the logical diagram of status information recording and display by the colored lights.

FIG. 5 shows the status information controlled by MSC and display embodied by colored lights.

Red light has the important function of notifying users that whenever the red light is on, it is NOT safe to go into the house or office. A burglary, for example, might be taking place at that moment. Whereas green light would show that a burglary or some other intrusion took place already, with some recordings made.

The Quad format display logic inside LAS 44 can be implemented by commonly available logic ICs of AND gates, NAND gates, OR gates and/or NOR gates, or by programming software inside MSC.

Figure 6:
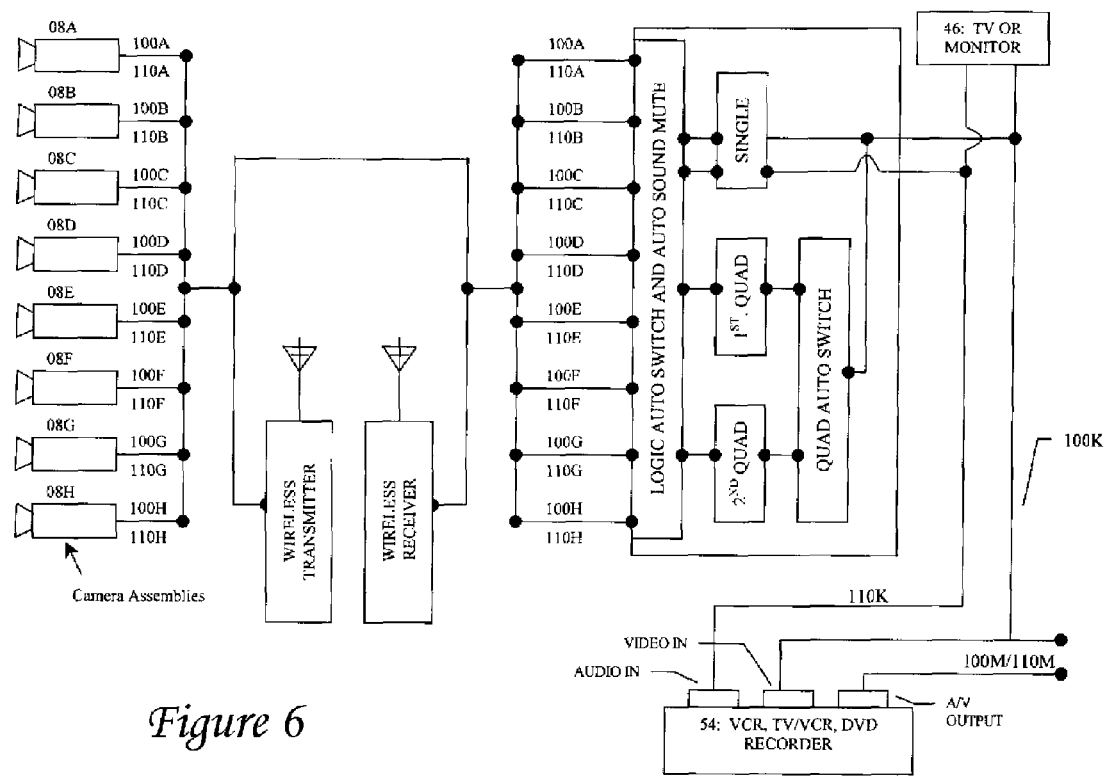
FIG. 6 shows the construction diagram of camera units connected to the Logic Auto Switch unit and the recording system.
Figure 7:
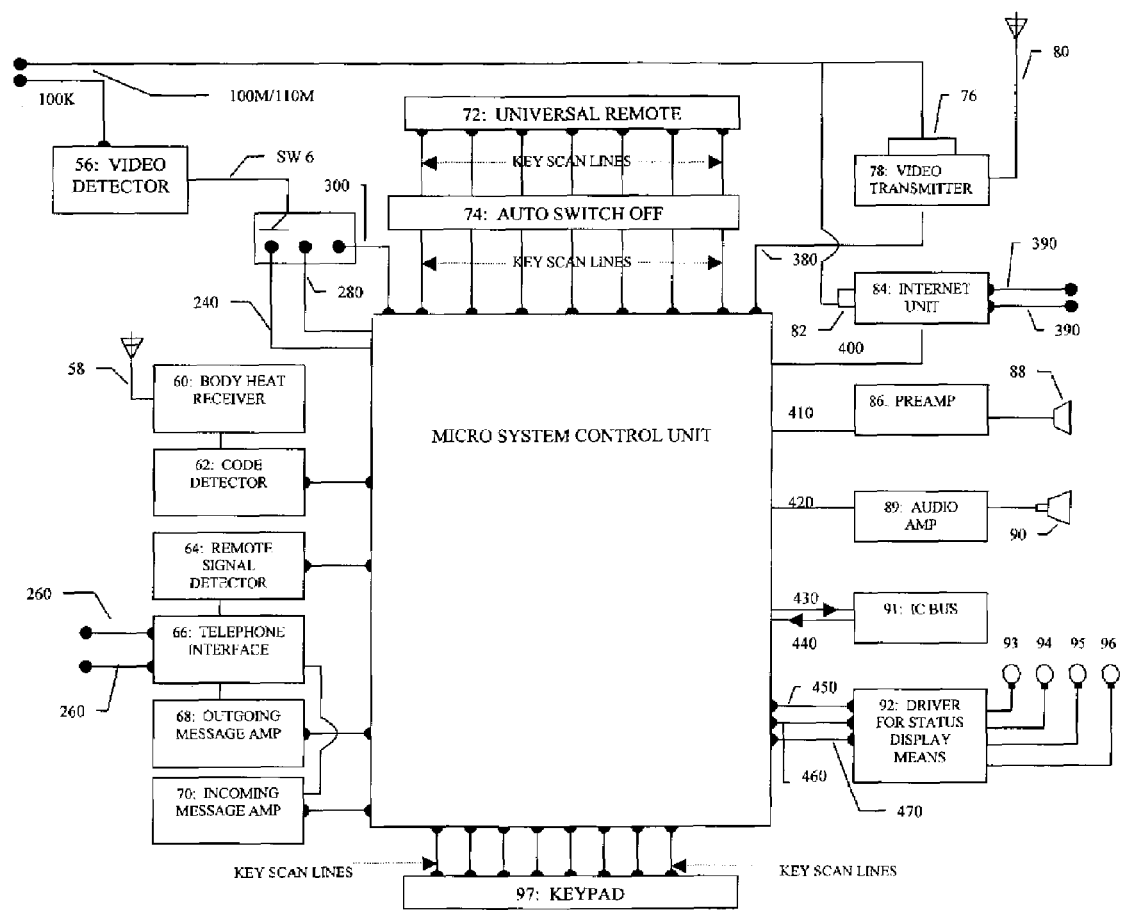
FIG. 7 shows a portion of system diagram featuring the connection to and from the Micro System Controller ("MSC") unit.

In FIG. 6, the connection of camera assembly 08A-08H to the Logic Auto Switch is shown, as well as the image display to the display means 46 and recording means 54. 8 letters from A, B, C, D, E, F, G, H are used to signify the usage where 8 camera units are employed, resulting in up to two Quad format images shown In FIG. 7, VCR 54, or equivalent recording equipment 54, will engage in the RECORD or PAUSE action in accordance with the signal sent from video detector 56. SW6 uses keyscan 280, position 240 (pause) and position 300 (record) to control the recording or pause action. When video detector 56 detects signal, due to motion detector(s) being triggered, switch SW 6 would be placed in record position 300. When no motion is detected, video detector 56 will cause switch SW6 to be placed on a pause position 240. MSC turn on keys of Auto Switch Off 72.

URC 72 would send the control signal to VCR 54, or equivalent recording equipment 54, to start the recording. MSC also send the record data to IC BUS 91 and turn the green light and red light on. Red light will go off when no motion is being detected at any moment.

MSC further has a microphone 88 for recording greeting message. Preamp 86 will amplify microphone signal and send to MSC, which will convert analog audio signal 410 to digital form and store on IC BUS 91 memory. Amp 89 will amplify audio signal and send to speaker 90.

In FIG. 7, the MSC gets the signal from remote signal detector 64, connecting the telephone interface 66, and communicate with IC BUS 91 to let user enter pass code and then enter the following codes to activate/control present system, defined as follows:

Definition List 1

| Term | Definition |
| --- | --- |
| Code 01 | turn video transmitter 78 power on |
| Code 02 | turn video transmitter 78 power off |
| Code 03 | turn Internet unit 84 power on; or enabled |
| Code 04 | turn Internet unit 84 power off; or disabled |
| Code 05 | play VCR 54, or equivalent recording equipment 54 |
| Code 06 | stop VCR 54, or equivalent recording equipment 54 |
| Code 07 | fast-forward VCR 54, or equivalent recording equipment 54 |
| Code 08 | rewind VCR 54, or equivalent recording equipment 54 |
| Code 09 | pause VCR 54, or equivalent recording equipment 54 |
| Code 10 | VCR 54 input selection (for VCR having multiple line-ins) |
| Code 11 | TV/VCR selection switch |
| Code 12 | check status recorded on IC BUS 91 |
| Code 13 | check outgoing message |
| Code 14 | fast-forward/skip of recorded message on IC BUS 91 |
| Code 15 | rewind of recorded message on IC BUS 91 |
| Code 16 | DVD/VCR switch control |
| Code 17 | DVD/DVD/R switch control |
| Code 18 | Power On/Off VCR |

Figure 8:
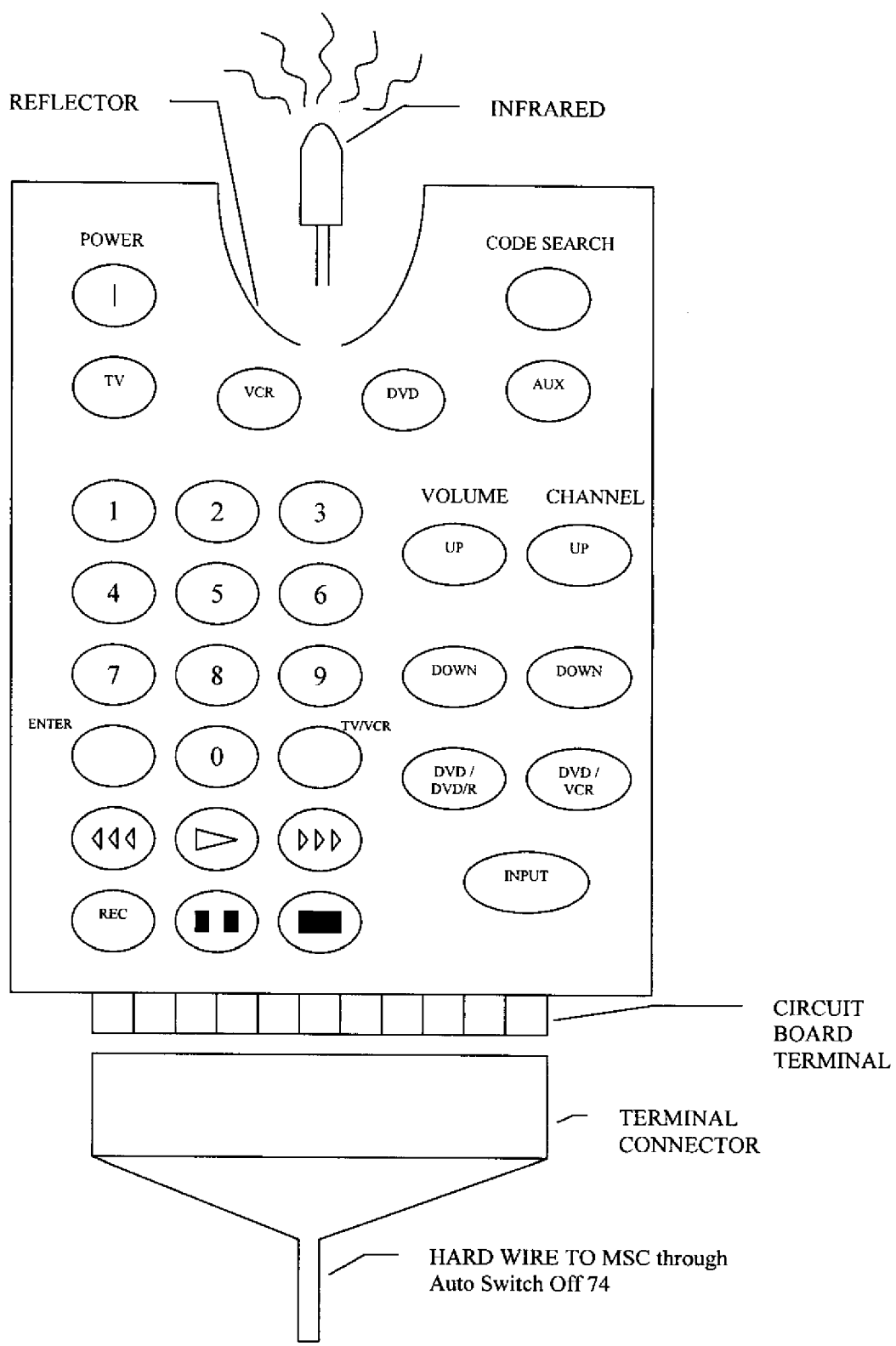
FIG. 8 shows a Universal Remote Control having additional parabola shaped reflector built-in. The buttons on FIG. 8 are indicative of typical button layout on a remote control and not necessarily the exact number or matching number to the circuit shown in FIGS. 9, 9a and 9b.

FIG. 8 shows a universal remote control URC 72, with slight modification to fit the need of present invention. At the tip of the URC 72, a reflector in a general parabola shape is placed around and underneath the infrared emitter, to better enhance the power of infrared light focus beamed to the remote receiver of recording means 54.

At bottom of URC 72, a circuit board terminal is shown for attaching to a terminal connector and hot-wired to MSC through Auto Switch Off 74. The amount of push-buttons on FIG. 8 is only indicative of the buttons on a remote control and is not necessarily the exact number of buttons or the matching buttons to the circuits shown in FIGS. 9, 9A or 9B.

Figure 9:
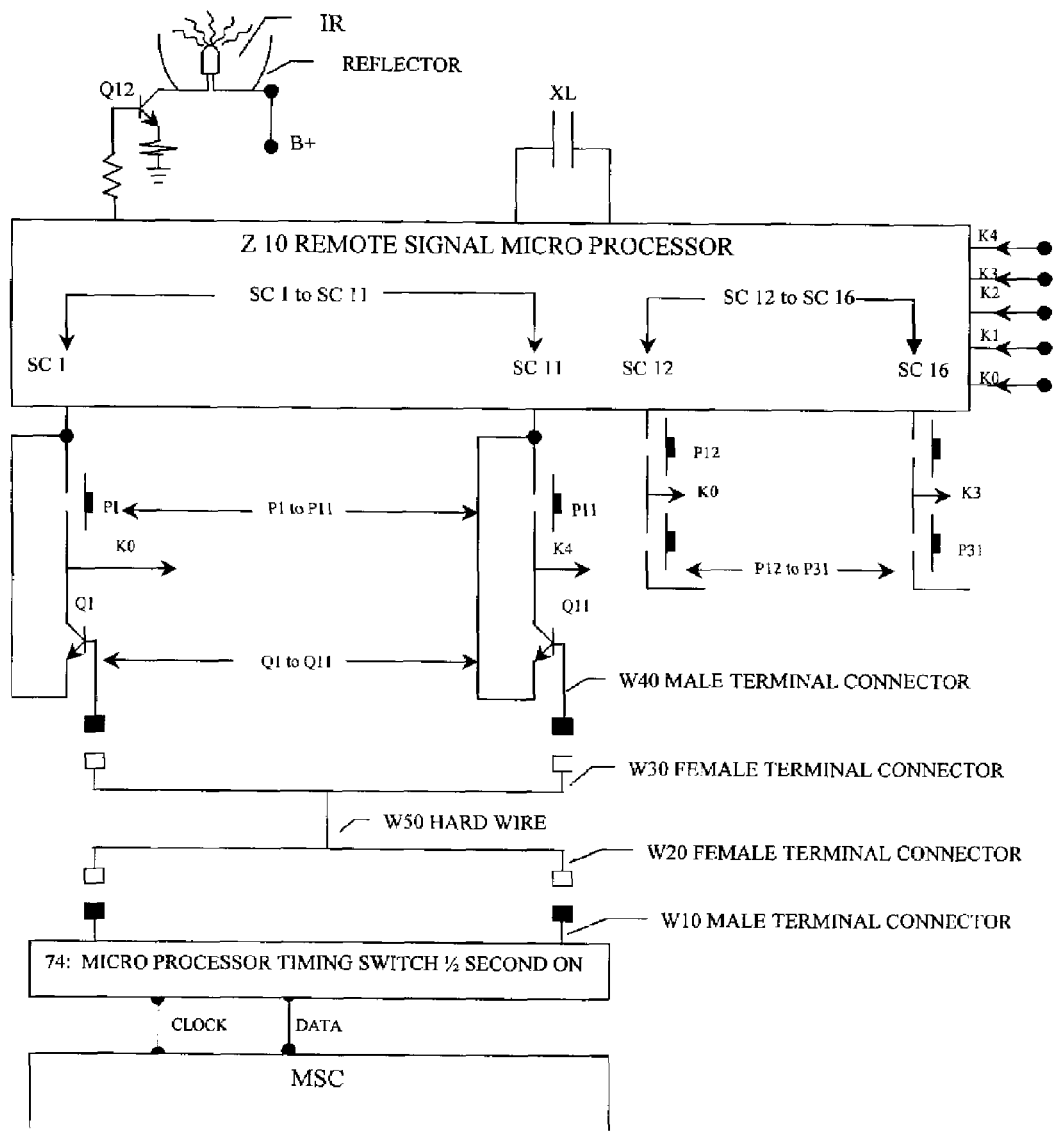
FIGS. 9, 9a and 9b show the block diagram of the Universal Remote Control, as well as its circuitry and connection to its input interface for receiving command and emitting infrared frequency to recording or display means.

FIG. 9 shows the block diagram of URC 72 under present invention. URC 72 is connected, via W10, W20, W30, W40 and W50 male/female and hard wires, via the micro processor timing switch (Auto Switch Off 74) to MSC. A remote signal processor Z10 has scan lines SC1 to SC16 for scanning signal input.

Figure 9A:
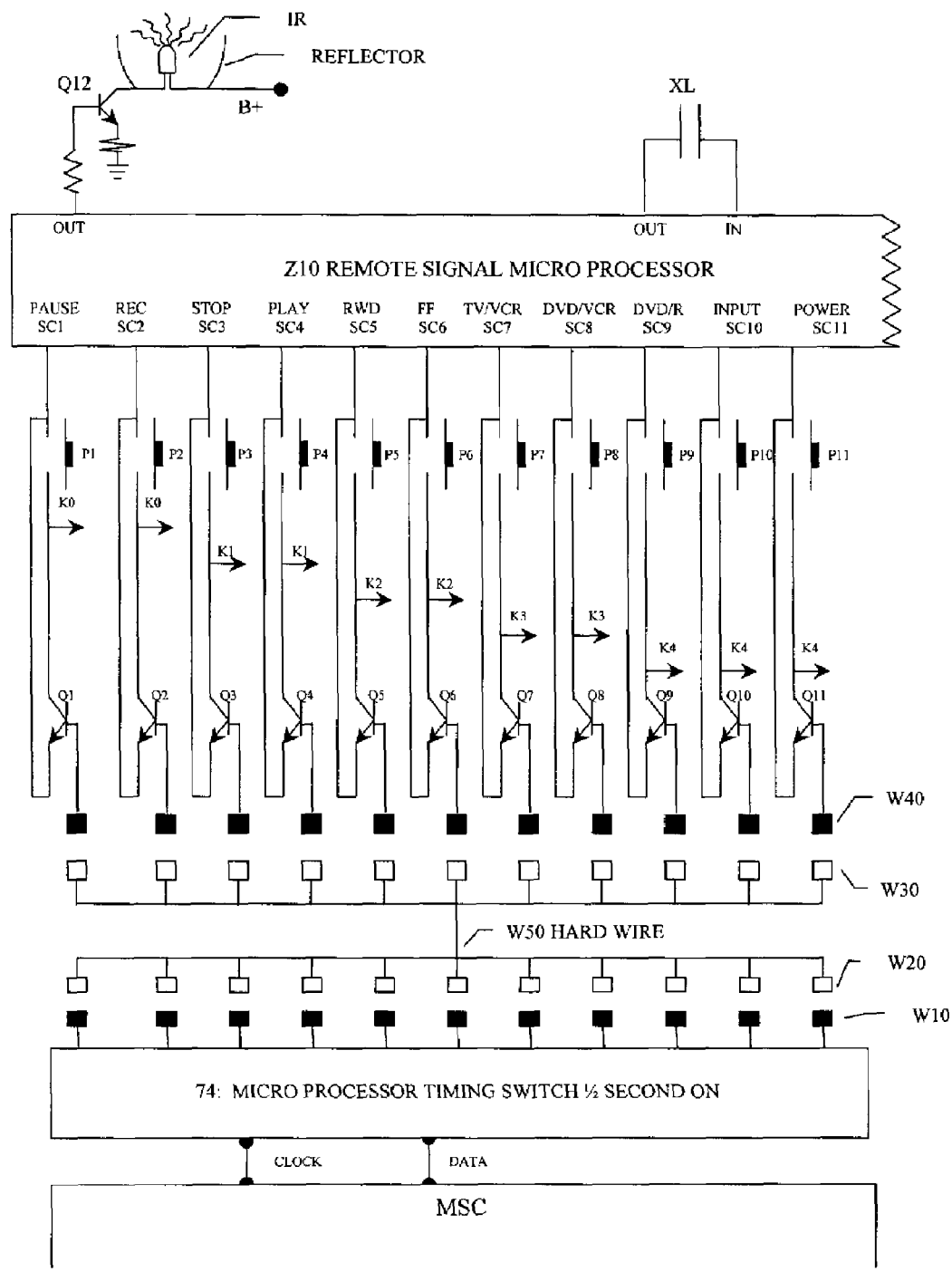

FIG. 9a shows, when command is received from telephone interface 66 or video detector 56, MSC will cause microprocessor timing switch (auto off switch) 74 to give corresponding bias to switches Q1 to Q11, corresponding carbon switches P1 to P11. Remote signal processor Z10 will produce the requisite signal frequency under command of key scan K0-K4 and switches Q1-Q11, sending the key input signal to Q12 that amplifies the signal for the IR (Infra Red) emitter and light up the Infrared and also transmitting infrared wave to remote receiver of recording means 54.

Figure 9B:
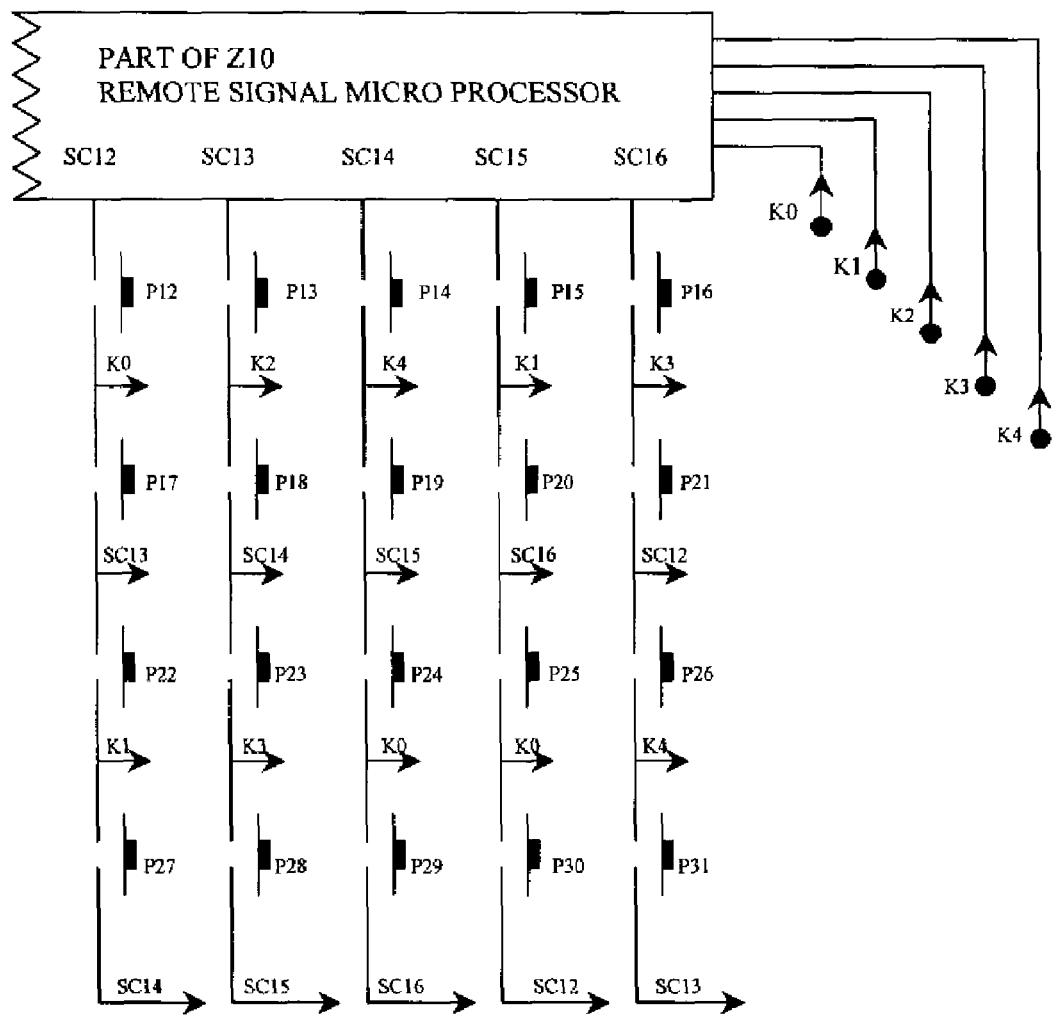

FIG. 9b shows the remaining portion of URC 72 that function like a regular remote control, wherein each switch, from P12-P31, has the down/up resilience for user pressing.

Note that before users can start using a security system as taught by present invention, said URC 72 must be calibrated to the "channel" of the household VCR 54 or other recording equipment.

What is claimed is:

1. A security camera and monitor system for homes or offices, comprising:
 a. a plurality of motion detectors situated at predetermined spots having timing control logic that allows a user-selectable Sustained Detection Period, in which audio/video signals are transmitted to recording and display means;

b. a plurality of body heat sensors situated at predetermined spots powered on by battery and having codes generator means and wireless transmitting means for said codes;
c. a plurality of video cameras, having microphone intake units either integrated in the camera units or housed separately, situated at predetermined spots to capture visual images and audio signals for transmitting and recording;
d. means for displaying captured images;
e. means for recording captured images;
f. a Video Controller and a Audio Controller with each said camera unit that controls separate switches to transmit audio/video signals to recording and display means;
g. a plurality of lamps powered by a relay which is further controlled by the motion detector of said camera;
h. a plurality of infrared lights situated at predetermined spots, corresponding to and controlled by said plurality of motion detectors to illuminate the spots when activated by said motion detectors;
i. a Micro System Controller ("MSC") unit consisting of modern CPU together with memory IC, and connection to a variety of signal and code detectors, data keypad and serial and parallel I/O port, as well as ports to phone lines and other forms of network/Internet connection, and connection to remote control unit;
j. a body heat receiver for receiving wireless transmission of codes from said body heat sensors and an associated code detector that transmitted received codes to MSC;
k. a Logic Auto Switch, whereby said Logic Auto Switch controls the display of captured images in a single or four-image-per-Quad format, depending on the numbers of cameras activated;
l. a Universal Remote Control ("URC") unit, having on/off electronic switches allowing normal press-release on/off action, and further having additional parabola reflector around the infrared emitter for better focusing, hooked up to said MSC unit;
m. an Auto Switch Off microprocessor timing switch, electronically placed between said URC and said MSC, providing bias to a plurality of the electronic switches on said URC for roughly 0.5 second on and staying off until receiving next command;
n. a Video Detector to detect the existence of video signal from said Logic Auto Switch output and will cause recording means to start/pause recording when command is issued by MSC, via said URC hotwired to MSC;
o. a status display means connected to and controlled by said MSC via a driver unit;
p. a telephone interface having touch-tone recognition, status recording and voicing means utilized to set or reset said system and for responding to status inquiries corresponding to the conditions represented by defined status;
q. an IC BUS serving as preprogrammed memory IC for storing user greetings, commands and status information as represented by said colored lights or other forms of status representation;
r. an Internet unit connected to MSC for data communication of information stored on IC BUS or for receiving commands from Internet;
s. video transmitter connected to said MSC for wireless transmission of video signal out upon command from telephone connection; and,
t. power supply means to supply the necessary power wattage by converting household AC voltage (110v or 220v) to the proper voltage suitable for the consumption of all the elements.

2. The system of claim 1, wherein said motion detectors further having timing control logic or circuitry that allows a user-selectable Sustained Detection Period of between 1 to 60 seconds, after motion is detected, in which audio/video signals are transmitted to recording and display means.

3. The system of claim 2, whereby said status display means comprising external lights in the colors of red, green, orange and yellow, to show the status of security breach in a Security Monitor Session (SM Session), which is defined as the period between a user arming present system and disarming present system, so that:
   a. Red light will be on whenever motion is detected, and resulting in activation of audio/video recordation, during a SM Session;
   b. Green light will be on to show existence of audio/video recordation during a SM Session;
   c. Orange light will be on whenever body heat is detected by body heat sensor(s), during a SM Session; and
   d. Yellow light will be on to show existence of detection of body heat sensing during a SM Session.

4. The system of claim 3, wherein said means of recordation is a household VCR machine, or any image recordation equipment, that can be activated by said URC unit after said unit has been calibrated to the reception channel of said means of recordation.

5. The system of claim 4, whereby said Logic Auto Switch will fill up the viewable surface of a display means, usually a TV monitor, by a Single or Quad-image format for maximum of 4 captured images per Quad-image format from 4 video cameras and will activate the Quad-image switching function to alternate the display of first-Quad, second-Quad, third-Quad, etc. when more than 4 of said video cameras are capturing and transmitting images.

6. The system of claim 5, whereby said an Auto Off Switch unit connected to said MSC will effectuate an "off position" on the REC/PAUSE switches on said Universal Remote Control, after said motion detectors activated said Micro System Controller which commands the recording means to engage in REC/PAUSE action.

7. The system of claim 6, whereby said body heat sensors, when detecting body heat, will send signals to said body heat receiver, and code detector will detect code that will be sent to said MSC, which will further cause said external status lights to show orange and/or yellow and record the status on the IC Bus.

8. The system of claim 7, whereby said MSC further having built-in microphone and preamplifier for recording user greetings on said IC BUS.

9. The system of claim 8, wherein a remote signal detector is connected to MSC to detect code signal from telephone interface, having codes defined as follows:
   Code 01: turn video transmitter power on
   Code 02: turn video transmitter power off
   Code 03: turn Internet unit 84 power on or enabled
   Code 04: turn Internet unit 84 power off or disabled
   Code 05: play VCR 54, or equivalent recording equipment 54
   Code 06: stop VCR 54, or equivalent recording equipment 54
   Code 07: fast-forward VCR 54, or equivalent recording equipment 54

Code 08: rewind VCR 54, or equivalent recording equipment 54
Code 09: pause VCR 54, or equivalent recording equipment 54
Code 10: VCR 54 input selection (for VCR having multiple line-ins)
Code 11: TV/VCR selection switch
Code 12: check status recorded on IC BUS 91
Code 13: check outgoing message
Code 14: fast-forward/skip of recorded message on IC BUS 91
Code 15: rewind of recorded message on IC BUS 91
Code 16: DVD/VCR switch control
Code 17: DVD/DVD/R switch control
Code 18: Power On/Off VCR.

10. The system of claim 9, wherein said telephone interface further having a plurality of push-buttons for operation by user fingers that will provide voiced status information corresponding to said status lights.

11. The system of claim 9, wherein said the range of temperature detection for said body heat detector is set for normal human temperature of between 86 and 99 degrees Fahrenheit, unless overwritten by users.

* * * * *